United States Patent Office 3,502,687
Patented Mar. 24, 1970

3,502,687
DIOXINOPIPERIDINES
John H. Biel, Milwaukee, Wis., assignor to Aldrich Chemical Company, Inc., Milwaukee, Wis., a corporation of Wisconsin
No Drawing. Filed Jan. 4, 1966, Ser. No. 518,545
Int. Cl. C07d 95/00; A61k 27/00
U.S. Cl. 260—293.4   9 Claims

ABSTRACT OF THE DISCLOSURE 2,2-substituted-4H-m-dioxino[4,5-e]piperidines possess antispasmodic activity and are useful to relax smooth muscle in the alimentary tract.

---

This invention relates to novel compounds. More particularly, this invention relates to novel compounds which possess valuable therapeutic utility as antispasmodic agents and to processes useful in the preparation thereof.

It is an object of this invention to provide a new class of therapeutic compounds. It is another object of the present invention to provide novel compounds having antispasmodic activity. It is a further object of the present invention to provide a process for preparing the novel therapeutic compounds.

These and other objects which may appear as the specification proceeds are achieved by this invention which comprises the provision of compounds selected from the group consisting of compounds having the following formula

I

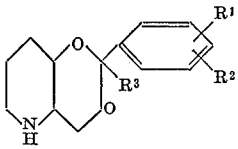

wherein:
$R^1$ and $R^2$ each represent a member selected from the group consisting of hydrogen, (lower)alkyl, chloro, bromo, fluoro, iodo, trifluoromethyl, (lower)alkoxy, nitro, (lower)alkylthio, di(lower)alkylamino, phenyl, phenoxy, benzyl, and when taken together, methylenedioxy;
$R_3$ is a member selected from the group consisting of (lower)alkynyl, cycloalkyl radicals having from 3 to 7 carbon atoms, e.g. cyclopropyl, cyclobutyl, cyclopentyl, cyclohexyl and cycloheptyl, pyridyl, thienyl and radicals of the formula

II

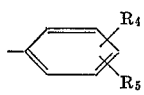

wherein $R^4$ and $R^5$ each represent a member selected from the group consisting of hydrogen, (lower)alkyl, chloro, bromo, fluoro, iodo, trifluoromethyl, (lower)-alkoxy, nitro, (lower)alkylthio, di(lower)alkylamino, phenyl, phenoxy, benzyl, and when taken together, methylenedioxy;
and the pharmaceutically acceptable nontoxic salts thereof.

The pharmaceutically acceptable nontoxic salts include the organic and inorganic acid addition salts, e.g., those prepared from acids such as hydrochloric, sulfuric, sulfamic, tartaric, fumaric, hydrobromic, hydriodic, glycolic, citric, maleic, phosphoric, succinic, acetic, nitric, cyclohexylsulfamic, naphthalenesulfonic, methane sulfonic acid and the like.

The term "lower)alkynyl" as used herein means both straight and branched chain aliphatic hydrocarbon radicals containing from 1 to 8 carbon atoms, e.g. methyl, ethyl, propyl, isopropyl, butyl, isobutyl t-butyl, amyl, hexyl, 2-ethylhexyl, octyl, etc.

The term "(lower)alkyl" as used herein means both straight and branched chain alkynyl radicals containing from 2 to 8 carbon atoms, e.g. ethinyl, propargyl, 1-propinyl, 3-methylpropingyl, 3-isopropylpropinyl, 1-butinyl, 2-butinyl, 1,1-dimethylpropargyl, 1-pentinyl, 1-heptinyl, etc.

Similarly where the term "(lower)" is used as part of the description of another group, e.g., (lower)alkoxy, it refers to the alkyl portion of such group which is therefore as described in connection with "(lower)alkyl."

A preferred group of compounds of this invention are those of the formula

III

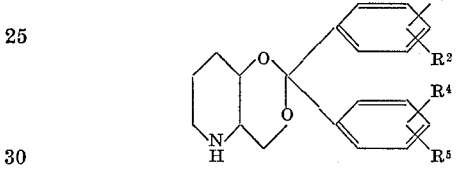

and the pharmaceutically acceptable nontoxic salts thereof, wherein $R^1$, $R^2$, $R^4$ and $R^5$ are as described above.

The compounds of the present invention are prepared according to the following general procedure which consists of reacting 2-hydroxymethyl-3-hydroxypiperidine, or a salt thereof, with a substituted methane of the formula

IV

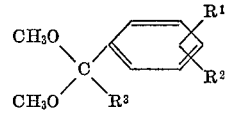

wherein $R^1$, $R^2$ and $R^3$ are as described above, in the presence of a non-reactive solvent, e.g., isopropanol, at elevated temperature, e.g., 160° C., for about one-half hour.

The starting material, 2-hydroxymethyl-3-hydroxypiperidine, is prepared by the hydrogenation of 3-hydroxy-2-hydroxymethylpyridine in the presence of a catalyst, e.g., rhodium on alumina (5%). The compound, 3-hydroxy-2-hydroxymethylpyridine, is a known compound described by D. Hemert and A. Martell, Tetrahedron 3, 49 (1958).

In the preferred method of preparing the compounds of this invention, 2-hydroxymethyl-3-hydroxypiperidine is utilized as the starting material.

The methanes of Formula IV used as starting materials to prepare the compounds of this invention are either well known in the art, or easily prepared in accordance with standard organic procedures previously described in the literature. For example, various methods for the preparation of dimethoxydiphenylmethane are described by W. Voss, Ann. 485, 283–98; P. E. Papadakis, J. Am. Chem. Soc. 58, 665–6 (1936); S. Goldschmidt and B. Acksteiner, Ann. 618, 173–85 (1958); and A. M. J. Ayres, J. Org. Chem. 27, 281–2 (1962). A method for the preparation of di(p-nitrophenyl)-dimethoxy methane is described by J. H. Gowin, J. Chem. Soc. 1959, 678–82.

The compounds of this invention have been found to possess significant antispasmodic activity. Thus the compounds are antispasmodic agents and are useful to relax smooth muscle in the alimentary tract.

The compounds of the present invention were tested for antispasmodic activity according to the methods described by Jackson (Experimental Pharmacology and Materia Medica, C. V. Mosby Co., St. Louis, Mo., 2nd ed., page 90) and Van Lieve et al. ("Effect of dl Amphetamine Sulfate and Its Isomers on Intestinal Motility," Journal of Pharmacology and Experimental Therapeutics, 103:187–189, 1951).

When the preferred compound of this invention, 2,2-diphenyl-4H - m - dioxino[4,5-e]piperidine hydrochloride, was tested for antispasmodic activity by the method of Jackson, in which the terminal ileum activity of the dog is measured, a decrease in tone was seen starting at a dose of 0.1 mg./kg. I.V. of the compound and the degree and duration increased with dosage. This indicated that 2,2-diphenyl-4H - m - dioxino[4,5-e]piperidine hydrochloride is an antispasmodic agent.

When 2,2-diphenyl-4H-m-dioxino[4,5-e]piperidine hydrochloride was tested for antispasmodic activity by the method of Van Lieve et al., in which an antispasmodic inhibits the propulsive motility of the small intestine of the dog, the following results were obtained:

| Dose mg./kg. orally: | Percent inhibition of propulsive motility of small intestine |
|---|---|
| 50 | 87.3 |
| 20 | 44.5 |
| 10 | 29.7 |
| 5 | 23.1 |
| 1 | 0 |

This also indicates that 2,2-diphenyl-4H-m-dioxino[4,5-e] piperidine hydrochloride is an antispasmodic agent.

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. The compositions may take the form of tablets, powder granules, capsules, suspensions, solutions and the like. Such compositions are considered within the scope of this invention.

The compositions of this invention when administered orally or parenterally, in an effective amount, are effective to relax smooth muscle in the alimentary tract.

The following examples are intended to illustrate the invention described herein without unduly restricting it.

EXAMPLE 1

Preparation of 2-hydroxymethyl-3-hydroxypiperidine

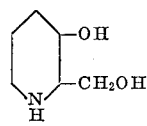

2 - hydroxymethyl - 3 - hydroxypyridine hydrochloride (323.2 gm. 2.0 mol) in a total volume of 2000 ml. of a solution of water containing sufficient hydrochloric acid to attain a pH of 3 was hydrogenated over 15 gm. of rhodium on alumina (5%) catalyst at 850 p.s.i. and 35° C. The uptake of hydrogen was complete in 4.5 hours. After filtration of the catalyst and removal of the solvent in vacuo, the slightly green solid residue was dissolved in a minimum amount of boiling water and the resultant solution treated with "Norite" (amorphous carbon), filtered, and the water removed in vacuo. The white solid residue was recrystallized from methanol and acetone to give 205.6 gm. of 2-hydroxymethyl-3-hydroxypiperidine hydrochloride; M.P. 162–163° C., as white microprisms.

Analysis.—Calc'd for $C_6H_{14}ClNO_2$ (167.63): C, 42.98%; H, 8.42%; N, 8.36%; Cl, 21.15%. Found: C, 43.05%; H, 8.35%; N, 8.21%; Cl, 21.36%.

The free base was prepared by the treatment of 16.7 gm. (0.1 mol) of 2-hydroxymethyl-3-hydroxypiperidine hydrochloride in 30 ml. of absolute methanol with 5.4 gm. (0.1 mol) of sodium methoxide in 30 ml. of absolute methanol. After filtration from sodium chloride and evaporation of the methanol in vacuo, the oily residue was distilled to give 10.2 gm. of 2-hydroxymethyl-3-hydroxypiperidine as a colorless viscous oil, B.P. 121–124° C. (0.43 mm.).

EXAMPLE 2

Preparation of 2,2-Diphenyl-4H-m-dioxino [4,5-e]piperidine hydrochloride

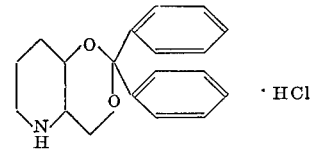

A mixture of 16.7 gm. (0.1 mol) dry 2-hydroxymethyl-3-piperidinol hydrochloride, 22.8 gm. (0.1 mol) of dry diphenyl-dimethoxymethane and 30 ml. of absolute isopropanol was slowly heated (160° C.) with vigorous stirring and allowing the removal of solvent. After maintaining this temperature for 0.5 hour, the mixture was allowed to cool to 120° C. and dry hydrogen chloride was passed below the surface of the white semi-solid for 0.25 hour. The cake was broken up and the mixture heated once more to 160° C. for 0.5 hour, then aspirator vacuum applied for 0.25 hour to remove traces of solvent. After cooling to room temperature (under aspirator vacuum applied) white solid was pulverized and extended twice with 150 ml. portions of anhydrous ether. The ether contained 3.4 gm. of benzophenone, M.P. 45–50° C., and the solid residue, M.P. 155–208° C., contained some of the starting diol (M.P. 162–163° C.) as shown by the presence of the hydroxyl band in the infrared. Fractional crystallization from isopropanol effected separation of the product from the starting diol. The first fraction, which crystallized at room temperature, weighed 11.5 gm., M.P. 264–269° C. (dec.). It was further recrystallized from methanol to afford 11.3 gm. of the ketalized product, 2,2-diphenyl-4H-m-dioxino[4,5-e]piperidine hydrochloride, M.P. 269–272° C.

Analysis.—Calc'd for $C_{19}H_{22}ClNO_2$ (331.83): C, 68.77%; H, 6.68%; N, 4.22%; Cl, 10.69%. Found: C, 68.97%; H, 6.66%; N, 4.43%; Cl, 10.82%.

EXAMPLE 3

When, in the procedure of Example 2, diphenyldimethoxymethane is replaced by an equal molar amount of cyclopropylphenyldimethoxymethane,
cyclohexylphenyldimethoxymethane,
cyclobutylphenyldimethoxymethane,
cycloheptylphenyldimethoxymethane,
cyclopentylphenyldimethoxymethane,
(N-pyridyl)-phenyldimethoxymethane,
(2-thienyl)-phenyldimethoxymethane,
(3-thienyl)-phenyldimethoxymethane,
ethinylphenyldimethoxymethane,
ethinyl-(4-chlorophenyl)dimethoxymethane,
propargylphenyldimethoxymethane,
(1-pentinyl)-phenyldimethoxymethane,
di(4-nitrophenyl)dimethoxymethane,
(4-chlorophenyl)-phenyldimethoxymethane, (4-trifluoromethylphenyl)-phenyldimethoxymethane,
di(4-trifluoromethylphenyl)dimethoxymethane,
(4-methoxyphenyl)-phenyldimethoxymethane,
di(4-methoxyphenyl)dimethoxymethane,
(2-fluorophenyl)-(3-bromophenyl-)dimethoxymethane,
(3,4-dimethoxyphenyl)-phenyldimethoxymethane,
(3,4-methylenedioxyphenyl)-phenyldimethoxymethane,
(4-methylphenyl)-phenyldimethoxymethane,
(2-ethylphenyl)-phenyldimethoxymethane,
(2,6-dichlorophenyl)-phenyldimethoxymethane,
(2-chloro-4-methylphenyl)-phenyldimethoxymethane,
(3-dimethylaminophenyl)-phenyldimethoxymethane,
(2-iodophenyl)-phenyldimethoxymethane,
(2-methylthiophenyl)-phenyldimethoxymethane,
(4-phenylphenyl)-phenyldimethoxymethane,
(4-phenoxyphenyl)-phenyldimethoxymethane,
(4-benzylphenyl)-phenyldimethoxymethane,
(4-diethylaminophenyl)-phenyldimethoxymethane,
(2-chlorophenyl)-phenyldimethoxymethane and
(3-chlorophenyl)-phenyldimethoxymethane, there are obtained, 2-cyclopropyl-2-phenyl-4H-m-dioxino[4,5-e]piperidine,
2-cyclohexyl-2-phenyl-4H-m-dioxino[4,5-e]piperidine,
2-cyclobutyl-2-phenyl-4H-m-dioxino[4,5-e]piperidine,
2-cycloheptyl-2-phenyl-4H-m-dioxino[4,5-e]piperidine,
2-cyclopentyl-2-phenyl-4H-m-dioxino[4,5-e]piperidine,
2-(N-pyridyl)-2-phenyl-4H-m-dioxino[4,5-e]piperidine,
2-(2-thienyl)-2-phenyl-4H-m-dioxino[4,5-e]piperidine,
2-(3-thienyl)-2-phenyl-4H-m-dioxino[4,5-e]piperidine,
2-ethinyl-2-phenyl-4H-m-dioxino[4,5-e]piperidine,
2-ethinyl-2-(4-chlorophenyl)-4H-m-dioxino[4,5-e]piperidine,
2-propargyl-2-phenyl-4H-m-dioxino[4,5-e]piperidine,
2-(1-pentinyl)-2-phenyl-4H-m-dioxino[4,5-e]piperidine,
2,2-di(4-nitrophenyl)-4H-m-dioxino[4,5-e]piperidine,
2-(4-chlorophenyl)-2-phenyl-4H-m-dioxino[4,5-e]piperidine,
2-(4-trifluoromethylphenyl)-2-phenyl-4H-m-dioxino[4,5-e]piperidine,
2,2-di(4-trifluoromethylphenyl)-4H-m-dioxino[4,5-e]piperidine,
2-(4-methoxyphenyl)-2-phenyl-4H-m-dioxino[4,5-e]piperidine,
2,2-di(4-methoxyphenyl)-4H-m-dioxino[4,5-e]piperidine,
2-(2-fluorophenyl)-2-(3-bromophenyl)-4H-m-dioxino[4,5-e]piperidine,
2-(3,4-dimethoxyphenyl)-2-phenyl-4H-m-dioxino[4,5-e]piperidine,
2-(3,4-methylenedioxyphenyl)-2-phenyl-4H-m-dioxino[4,5-e]piperidine,
2-(4-methylphenyl)-2-phenyl-4H-m-dioxino[4,5-e]piperidine,
2-(2-ethylphenyl)-2-phenyl-4H-m-dioxino[4,5-e]piperidine,
2-(2,6-dichlorophenyl)-2-phenyl-4H-m-dioxino[4,5-e]piperidine,
2-(2-chloro-4-methylphenyl)-2-phenyl-4H-m-dioxino[4,5-e]piperidine,
2-(3-dimethylaminophenyl)-2-phenyl-4H-m-dioxino[4,5-e]piperidine,
2-(2-iodophenyl)-2-phenyl-4H-m-dioxino[4,5-e]piperidine,
2-(2-methylthiophenyl)-2-phenyl-4H-m-dioxino[4,5-e]piperidine,
2-(4-phenylphenyl)-2-phenyl-4H-m-dioxino[4,5-e]piperidine,
2-(4-phenoxyphenyl)-2-phenyl-4H-m-dioxino[4,5-e]piperidine,
2-(4-benzylphenyl)-2-phenyl-4H-m-dioxino[4,5-e]piperidine,
2-(4-diethylaminophenyl)-2-phenyl-4H-m-dioxino[4,5-e]piperidine,
2-(2-chlorophenyl)-2-phenyl-4H-m-dioxino[4,5-e]piperidine and
2-(3-chlorophenyl)-2-phenyl-4H-m-dioxino[4,5-e]piperidine, respectively.

While this invention has been described and exemplified in terms of its preferred embodiment, those skilled in the art will appreciate that modifications can be made without departing from the spirit and scope of this invention.

What is claimed is:

1. A compound having the formula

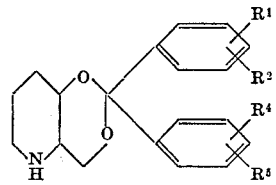

wherein $R^1$, $R^2$, $R^4$ and $R^5$ each represent a member selected from the group consisting of hydrogen, (lower)alkyl, chloro, bromo, fluoro, iodo, trifluoromethyl, and (lower)alkoxy.

2. A compound of claim 1 having the formula

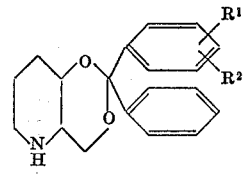

wherein $R^1$ and $R^2$ each represent a member selected from the group consisting of hydrogen, (lower)alkyl, chloro, bromo, iodo, fluoro, trifluoromethyl, and (lower)alkoxy.

3. The compound of claim 1 having the formula

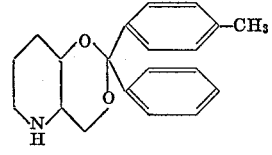

4. The compound of claim 1 having the formula

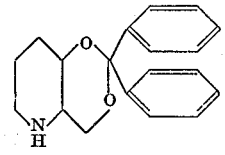

5. A pharmaceutically acceptable nontoxic salt of the compound of claim 4.

6. The compound of claim 1 having the formula

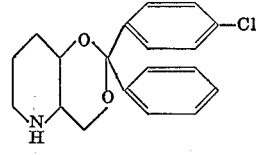

7. The compound of claim 1 having the formula

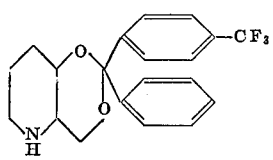

8. The compound of claim 1 having the formula

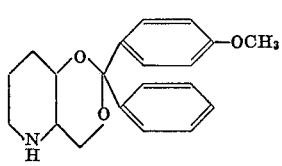

9. The compound of claim 1 having the formula
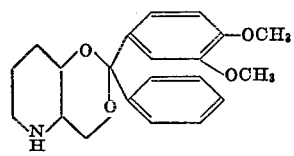
References Cited
Ratle et al.: Chem. Abstracts, vol. 66 (1967), page 18779h.
JAMES A. PATTEN, Primary Examiner
U.S. Cl. X.R.
260—293.2, 294.7, 294.8, 297, 296, 332.3, 340.5, 574, 609, 611, 612, 613; 424—267